United States Patent [19]

Miller

[11] Patent Number: 5,413,695
[45] Date of Patent: * May 9, 1995

[54] PROCESS FOR PRODUCING LUBE OIL FROM SOLVENT REFINED OILS BY ISOMERIZATION OVER A SILICOALUMINOPHOSPHATE CATALYST

[75] Inventor: Stephen J. Miller, San Francisco, Calif.

[73] Assignee: Chevron Research and Technology Company, a Division of Chevron U.S.A. Inc., San Francisco, Calif.

[*] Notice: The portion of the term of this patent subsequent to Aug. 4, 2009 has been disclaimed.

[21] Appl. No.: 1,007

[22] Filed: Jan. 6, 1993

[51] Int. Cl.$^6$ .............. C10G 73/02; C10G 73/38; C07C 5/22
[52] U.S. Cl. .......................... 208/28; 208/27; 208/18; 208/87; 585/739; 585/740; 585/750
[58] Field of Search ............ 208/18, 27, 89, 111, 208/106, 87, 86, 97, 58, 59, 28; 423/702, 328

[56] References Cited

U.S. PATENT DOCUMENTS

| | | | |
|---|---|---|---|
| 4,347,121 | 8/1982 | Mayer et al. | 208/58 |
| 4,859,311 | 8/1989 | Miller | 208/89 |
| 4,888,760 | 11/1989 | Pellet et al. | 502/67 |
| 4,960,504 | 10/1990 | Pellet et al. | 208/411 |
| 5,135,638 | 8/1992 | Miller | 208/27 |
| 5,146,022 | 9/1992 | Buchanen et al. | 585/12 |

FOREIGN PATENT DOCUMENTS 1546398 5/1979 Netherlands .

*Primary Examiner*—Asok Pal
*Assistant Examiner*—Bekir L. Yildirim
*Attorney, Agent, or Firm*—J. A. Scholten; V. J. Cavalieri

[57] ABSTRACT

The invention provides for a process for producing lube oil having excellent viscosity and viscosity index properties and a low pour point from a solvent refined gas oil. The process comprises contacting a raffinate having a solvent dewaxed viscosity index of at least 90 and boiling above 350° F. with a catalyst comprising an intermediate pore size silicoaluminophosphate molecular sieve and at least one Group VIII metal under dewaxing and isocracking conditions so as to produce a product having a viscosity index greater than about 110.

18 Claims, 3 Drawing Sheets

MEDIUM RAFFINATE VI VERSUS
MEDIUM RAFFINATE YIELD FROM WEST TEXAS VGO

PROCESS FOR PRODUCING LUBE OIL FROM SOLVENT REFINED OILS BY ISOMERIZATION OVER A SILICOALUMINOPHOSPHATE CATALYST

BACKGROUND

1. Field of the Invention

The present invention relates to a process for catalytically dewaxing lube oils. In particular the invention relates to a process for producing lube oil having an increased viscosity index by contacting a solvent extracted hydrocarbonaceous oil feedstock with a silicoaluminophosphate molecular sieve.

2. Description of the Related Art

In general, the basic premise in lubricant refining is that a suitable crude oil, as shown by experience or by assay, contains a quantity of lubricant stock. The lubricant stock should have a predetermined set of properties, for example, appropriate viscosity, oxidation stability, and maintenance of fluidity at low temperatures. Current trends in the design of automotive engines are associated with higher operating temperatures as the efficiency of the engines increases. These higher operating temperatures require successively higher quality lubricants; one requirement is for higher viscosity indices (V.I.) in the lube oil in order to reduce the effects of the higher operating temperatures on the viscosity of the engine lubricants.

Viscosity index indicates the degree of change of viscosity with temperature. A high viscosity index of 100 indicates an oil that does not tend to become viscous at low temperature or become thin at high temperatures. For purposes of the present invention, whenever V.I. is referred to it is meant the V.I. as determined by ASTM D-2270.

Mineral oil based lubricants are conventionally produced by a set of subtractive unit operations to isolate the lubricant stock and to remove unwanted components from the oil. For the preparation of a high grade distillate lubricating oil stock, the current practice is to vacuum distill an atmospheric tower residuum from an appropriate crude oil as the first step. This provides one or more raw stocks having a boiling range of about 350° to about 1050° F. This is then further separated, under vacuum processes, into suitable boiling range distillate fractions (gas oils) and a residual fraction which, after deasphalting and severe solvent treatment may also be used as a lubricant base stock usually referred to as a bright stock. The gas oils undergo solvent extraction, also known as solvent refining, to remove low viscosity index components to produce oils known as neutral oils. These solvent extracted neutral oils are also known as raffinates.

The raffinates are solvent dewaxed by cooling oil-solvent admixtures under controlled conditions for crystallization of the paraffinic wax present in the admixtures. In such processes, the raffinates, or mixtures of raffinates and dewaxing solvent, are heated to a temperature at which the wax is dissolved. The heated charge is then passed into a cooling zone wherein cooling is undertaken at a uniform slow rate in the range of about 1° to 8° F./min. (0.56° to 4.4° C./min) until a temperature is reached at which a substantial portion of the wax is crystallized and at which dewaxed oil product has a selected pour point temperature. Upon achieving the desired dewaxing temperature, the mixture of wax crystals, oil and solvent is subjected to solid-liquid separation for recovery of a wax free oil-solvent solution and a solid wax containing a minor proportion of oil. This solid wax/oil composition is known as slack-wax.

The separated oil-solvent solution is subjected to distillation for recovery of a solvent fraction and a dewaxed oil product fraction. A refined lubricant stock may be used as such as a lubricant, or it may be blended with another refined lubricant stock having different properties. Or the refined lubricant stock, prior to use as a lubricant, may be compounded with one or more additives which function, for example, as antioxidants, extreme pressure additives, and V.I. improvers.

Slack wax may be recovered as is, or may be subjected to additional processing, such as repulp filtration for the removal of additional oil. Solid-liquid separation techniques which may be employed for separation of wax crystals from the oil-solvent solutions include known solid-liquid separation processes, such as gravity settling, centrifugation, and filtration. Most commonly, in commercial processes, filtration in a rotary vacuum filter, followed by solvent wash of the wax cake, is employed.

Solvents known to be useful as dewaxing solvents are the ketones containing 3 to 6 carbon atoms, for example, acetone, methylethylketone (MEK) and methylisobutylketone (MIBK); mixtures of ketones; and mixtures of ketones with aromatic hydrocarbons including benzene and toluene. Halogenated low molecular weight hydrocarbons, including dichloromethane and dichloroethane, and their mixtures are also known dewaxing solvents. Solvent dilution of waxy oil stocks maintains fluidity of the oil for facilitating easy handling, for obtaining optimum wax-oil separation, and for obtaining optimum dewaxed oil yields. The extent of solvent dilution depends upon the particular oil stocks and solvents used, the approach to filtration temperature in the cooling zone and the desired final ratio of solvent to oil in the separation zone.

Since processes which remove wax, such as solvent dewaxing, will give a low yield with very waxy feeds, catalytic dewaxing processes are preferred. Catalytic processes are more economical and lower the pour point of the waxy feedstock by selectively cracking the longer chain n-paraffins. A disadvantage associated with catalytically dewaxing a raffinate is that a number of useful products become degraded to lower molecular weight materials. For example, waxy paraffins may be cracked down to butane, propane, ethane and methane and so may the lighter n-paraffins which do not contribute to the waxy nature of the oil. Because these lighter products are generally of lower value than the higher molecular weight materials, it is desirable to limit the degree of cracking which takes place during a catalytic dewaxing process. Since lube oil is valuable, maximization of the yield is commercially important. Because the catalyst used in the process of this invention is very selective, the gas yield is reduced, thereby preserving the economic value of the feedstock.

U.S. Pat. No. 4,734,539 discloses a method for isomerizing a naphtha feed using an intermediate pore size zeolite catalyst, such as an H-offretite catalyst. U.S. Pat. No. 4,518,485 discloses a process for dewaxing a hydrocarbon feedstock containing paraffins by a hydrotreating and isomerization process.

U.S. Pat. No. 4,689,138 discloses an isomerization process for reducing the normal paraffin content of a hydrocarbon oil feedstock using a catalyst comprising an intermediate pore size silicoaluminophosphate molecular sieve containing a Group VIII metal component which is occluded in the crystals during growth.

U.S. Pat. No. 5,135,638 issued on Aug. 4, 1992 to Miller discloses a process for producing lube oil from a feedstock having greater than 50% wax. The feedstock is isomerized over a catalyst comprising a molecular sieve having generally oval 1-D pores having a minor axis between about 4.2 Å and about 4.8 Å and a minor axis between about 5.4 Å and about 7.0 Å and at least one Group VIII metal at a pressure of from about 15 psig to about 2000 psig.

U.S. Pat. No. 4,960,504 issued on Oct. 2, 1990 to Pellet et al. discloses a process for producing an oil having a reduced pour point by catalytically dewaxing the hydrocarbon feedstock using a catalyst comprising a silicoaluminophosphate and an inorganic oxide matrix. The patent does not indicate that it would be possible to produce a lube oil having an extra high V.I. from a solvent extracted feedstock.

U.S. Pat. No. 4,859,311 issued on Aug. 22, 1989 to Miller, the disclosure of which is incorporated herein by reference in its entirety, discloses a process for dewaxing a hydrocarbonaceous feedstock containing straight and slightly branched chain hydrocarbons by contacting the feedstock with a catalyst comprising SAPO-11 and a Group VIII metal.

SUMMARY OF THE INVENTION

The invention provides for a process for producing lube oil having excellent viscosity and viscosity index properties and a low pour point. Among other factors, it has now been found that it is possible to catalytically produce a lubricating oil having an extra high viscosity index from a solvent refined gas oil feedstock, (also denoted herein as a solvent extracted oil, a raffinate oil, or a neutral oil). It is another object of the invention to prepare such lubricants using slack wax as a component of the raffinate oil feedstock.

The process comprises contacting a raffinate oil feedstock having a solvent dewaxed viscosity index of at least 90 and boiling above 350° F. with a catalyst comprising an intermediate pore size silicoaluminophosphate molecular sieve and at least one Group VIII metal under dewaxing conditions so as to produce a product having a viscosity index greater than about 110. Preferably, the product has a V.I. of from about 110 to about 120. The silicoaluminophosphate molecular sieves used in the process of this invention are described in U.S. Pat. No. 4,440,871, which is incorporated wherein by reference in its entirety. Preferably, the molecular sieves are SAPO-11, SAPO-31, SAPO-41 and mixtures thereof.

Surprisingly, and in accordance with another embodiment, the invention provides for a process for catalytically producing a lubricating oil having an extra high viscosity index from a mixture of a solvent refined feedstock and a slack wax. The process comprises mixing a raffinate oil feedstock with a slack wax thereby forming a mixture; and contacting the mixture with a catalyst comprising an intermediate pore size silicoaluminophosphate molecular sieve and at least one Group VIII metal under dewaxing conditions so as to produce a product having a viscosity index greater than about 110.

The phrase "extra high viscosity index", as used herein means a hydrocarbonaceous oil having a viscosity index in the range of from about 110 to about 130. Those oils having a viscosity index greater than 130 would be considered ultra high viscosity index oils. Extra high V.I. is due to a very high paraffinic content in the oil. Due to this high paraffin content the lube oil of the invention provides a low viscosity for its boiling range. Such properties result in less frictional resistance, less engine wear and increased fuel efficiency. The low viscosity and low pour point of the lube oil result in easier cold engine starting than prior art mineral oils. The lube oil has a high viscosity index ranging from about 110 to about 130. The high paraffinic nature of the oil gives it improved oxidation resistance compared to conventional mineral oils.

The phrase "solvent dewaxed viscosity index" used herein means the viscosity index of an oil after it has been solvent dewaxed. Additional objects and advantages of the invention will be set forth in part in the description which follows, and in part will be obvious from the description, or may be learned by practice of the invention.

DETAILED DESCRIPTION OF THE INVENTION

Figure 1:
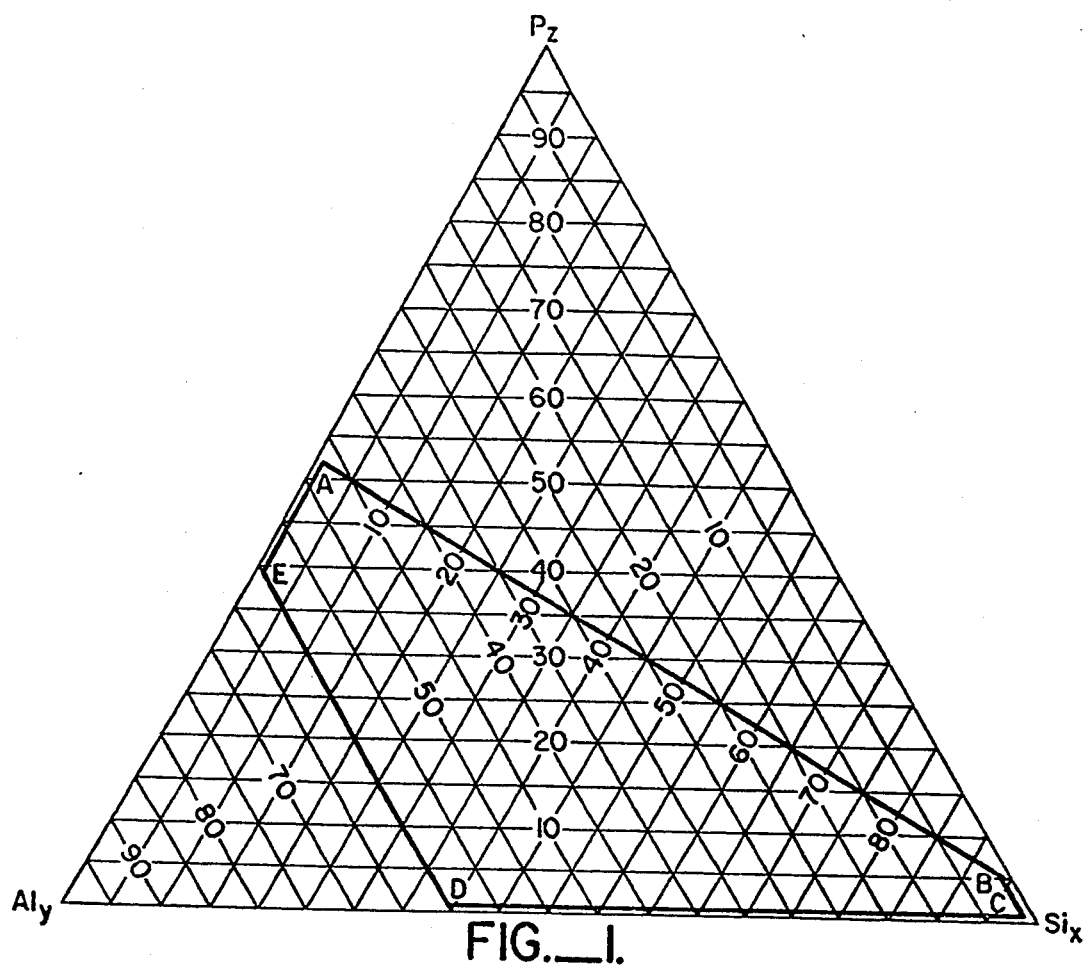
FIG. 1 is a ternary diagram showing the compositional parameters of the silicoaluminophosphates of U.S. Pat. No. 4,440,871 in terms of mole fractions of silicon, aluminum and phosphorus.

The present process is of particular utility with highly paraffinic feeds whose pour point and viscosity need to be maintained within certain specification limits. Preferably, the feedstock is a vacuum gas oil and more preferably the feedstock is a waxy heavy neutral, medium neutral, a light neutral oil or mixtures thereof having a solvent dewaxed viscosity index of at least 90. Most preferably the feedstock has a solvent dewaxed V.I. greater than about 95.

In general, the neutral oils are classified as heavy, medium, and light. Heavy neutral stock has a normal boiling range of from about 900° F. to about 1000° F.; a pour point not greater than about 20° F.; and a Saybolt viscosity at 100° F. of from about 500 to about 600. Medium neutral has a normal boiling range of from about 800° F. to about 900° F.; a pour point intermediate of heavy and light neutral oil; and a Saybolt viscosity at 100° F. of from about 200 to about 250. Light neutral stock has a normal boiling range of from about 700° F. to about 800° F.; a pour point not greater than about 5° F.; and a Saybolt viscosity at 100° F. of about 100.

The process of the invention n-ray also be employed in combination with conventional dewaxing processes to achieve a lube oil having particular desired properties. For example, the process of the invention can be used to reduce the pour point of a lube oil to a desired degree. Further reduction of the pour point can then be achieved using a conventional dewaxing process. Under such circumstances, immediately following the isomerization process of the invention, the lube oil may have a pour point greater than about 15° F. Further, the pour point of the lube oil produced by the process of the invention can be reduced by adding pour point depressant compositions thereto.

In another embodiment of the present invention, slack wax is mixed with one or more of the above neutral oils and isomerized over the catalyst to produce a product having a V.I. greater than about 110. Preferably the product has a V.I. of from about 110 to about 130, and most preferably of from about 115 to about 130. The slack wax used in accordance with the invention preferably will be of a grade higher than the raffinate feedstock. Non-limiting examples of this would be the admixture of a light neutral raffinate with a medium neutral slack wax or a medium neutral raffinate with a heavy neutral slack wax. Prior to mixing the slack wax with the raffinate, it is preferred that the slack wax have a viscosity that does not vary by more than about 10% from the desired lube stock product's viscosity. More preferably, the slack wax's viscosity will not vary by more than about 5% and most preferably the viscosity will be substantially the same as that of the desired lube stock product. The volumetric ratio of feedstock to slack wax in the mixture ranges from about 95:5 to about 1:1; preferably from about 10:1 to about 1:1, and most preferably from about 5:1 to about 1:1.

Slack wax can be obtained from either a hydrocracked lube oil or a solvent refined lube oil. Hydrocracking is preferred because that process can also reduce the nitrogen content to low values. With slack wax derived from solvent refined oils, deoiling can be used to reduce the nitrogen content. Optionally, hydrotreating of the slack wax can be carried out to lower the nitrogen content thereof.

A typical slack wax feed has the composition shown in Table I below. This slack wax is obtained from the solvent (MEK) dewaxing of a 300 SUS (65 cSt) neutral oil obtained from an Arab Light crude subjected to successive solvent dewaxing.

TABLE I

| Slack Wax Properties | | |
|---|---|---|
| Gravity, API | 39 | |
| Hydrogen, wt. pct. | 15.14 | |
| Sulfur, wt. pct. | 0.18 | |
| Nitrogen, ppm | 11 | |
| Melting point, °C. (°F.) | 57 (135) | |
| KV at 100° C., cST | 5.168 | |
| PNA, wt. pct: | | |
| Paraffins | 70.3 | |
| Naphthenes | 13.6 | |
| Aromatics | 16.3 | |
| Simulated Distillation: % | °C. | (°F.) |
| 5 | 375 | (710) |
| 10 | 413 | (775) |
| 30 | 440 | (825) |
| 50 | 460 | (860) |
| 70 | 482 | (900) |
| 90 | 500 | (932) |
| 95 | 507 | (945) |

Another slack wax suitable for use in the present process has the properties set out in Table II below. This wax is prepared by the solvent dewaxing of a 450 SUS (100 cS) neutral raffinate:

TABLE II

| Slack Wax Properties | |
|---|---|
| Boiling range, °C. (°F.) | 375–567 (708–1053) |
| Gravity, API | 35.2 |
| Nitrogen, basic, ppm | 23 |
| Nitrogen, total, ppm | 28 |
| Sulfur, wt. pct. | 0.115 |

TABLE II-continued

| Slack Wax Properties | |
|---|---|
| Hydrogen, wt. pct. | 14.04 |
| Pour point, °F. (°C.) | 120(50) |
| KV (100° C.) | 7.025 |
| KV (300° F., 150° C.) | 3.227 |
| Oil Content (D 3235) | 35 |
| Molecular wt. | 539 |
| P/N/A: | |
| Paraffins | — |
| Naphthenes | — |
| Aromatics | 10 |

Other useful slack waxes in the present invention are an Adelaide Medium Neutral slack-wax with properties shown in Table III and a Beaumont light neutral slack wax with properties shown in Table IV.

TABLE III

| | |
|---|---|
| Mol. Wt. (1524) | 453 |
| Gravity, API | 37.7 |
| Oil content (D3235) | 15% wt % |
| Mass Spec. Analysis (M1085) | wt % |
| paraffins | 78.5 |
| mononaphthenes | 8.3 |
| polynaphthenes | 4.8 |
| aromatics | 8.4 |

TABLE IV

| | |
|---|---|
| Mol. Wt. (M1524) | 338 |
| Oil content (D3235) | 16.3% wt % |
| Mass Spec. Analysis (M1085) | wt % |
| paraffins | 84.9 |
| mononaphthenes | 4.4 |
| polynaphthenes | 6.9 |
| aromatics | 3.8 |

While the process of the invention can be practiced with utility when the feed contains organic nitrogen (nitrogen containing impurities), it is preferred that the organic nitrogen content of the feed be less than about 50 ppm, more preferably less than about 10 ppm. Particularly good results, in terms of activity and length of catalyst cycle (period between successive regenerations or start-up and first regeneration) are experienced when the feed contains less than about 10 ppm of organic nitrogen.

The phrase "intermediate pore size", as used herein means an effective pore aperture in the range of from about 5.3 to about 6.5 Angstroms when the molecular sieve is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes, and larger branched alkanes having, for example, quaternary carbon atoms.

The effective pore size of the molecular sieves can be measured using standard adsorption techniques and hydrocarbonaceous compounds of known minimum kinetic diameters. See Breck, *Zeolite Molecular Sieves*, 1974 (especially Chapter 8); Anderson et al., J. Catalysis 58, 114 (1979); and U.S. Pat. No. 4,440,871, the pertinent portions of which are incorporated herein by reference.

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), 1,3,5-trimethylbenzene (7.5), and tributylamine (8.1). The preferred effective pore size range is from about 5.5 to about 6.2 Angstroms.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

The catalyst used in the isomerization process of the invention has an acidic component and a Group VIII metal component. Preferably the Group VIII metal is platinum or palladium. The acidic component preferably comprises an intermediate pore size silicoaluminophosphate molecular sieve which is described in U.S. Pat. No. 4,440,871, the pertinent disclosure of which is incorporated herein by reference.

The most preferred intermediate pore size silicoaluminophosphate molecular sieve for use in the process of the invention is SAPO-11. SAPO-11 comprises a molecular framework of corner-sharing [SiO$_2$] tetrahedra, [AlO$_2$] tetrahedra and [PO$_2$] tetrahedra, [i.e., (Si$_x$Al$_y$P)O$_2$ tetrahedral units]. When combined with a platinum or palladium hydrogenation component, the SAPO-11 converts the waxy components to produce a lubricating oil having excellent yield, very low pour point, low viscosity and a high viscosity index.

Figure 2:
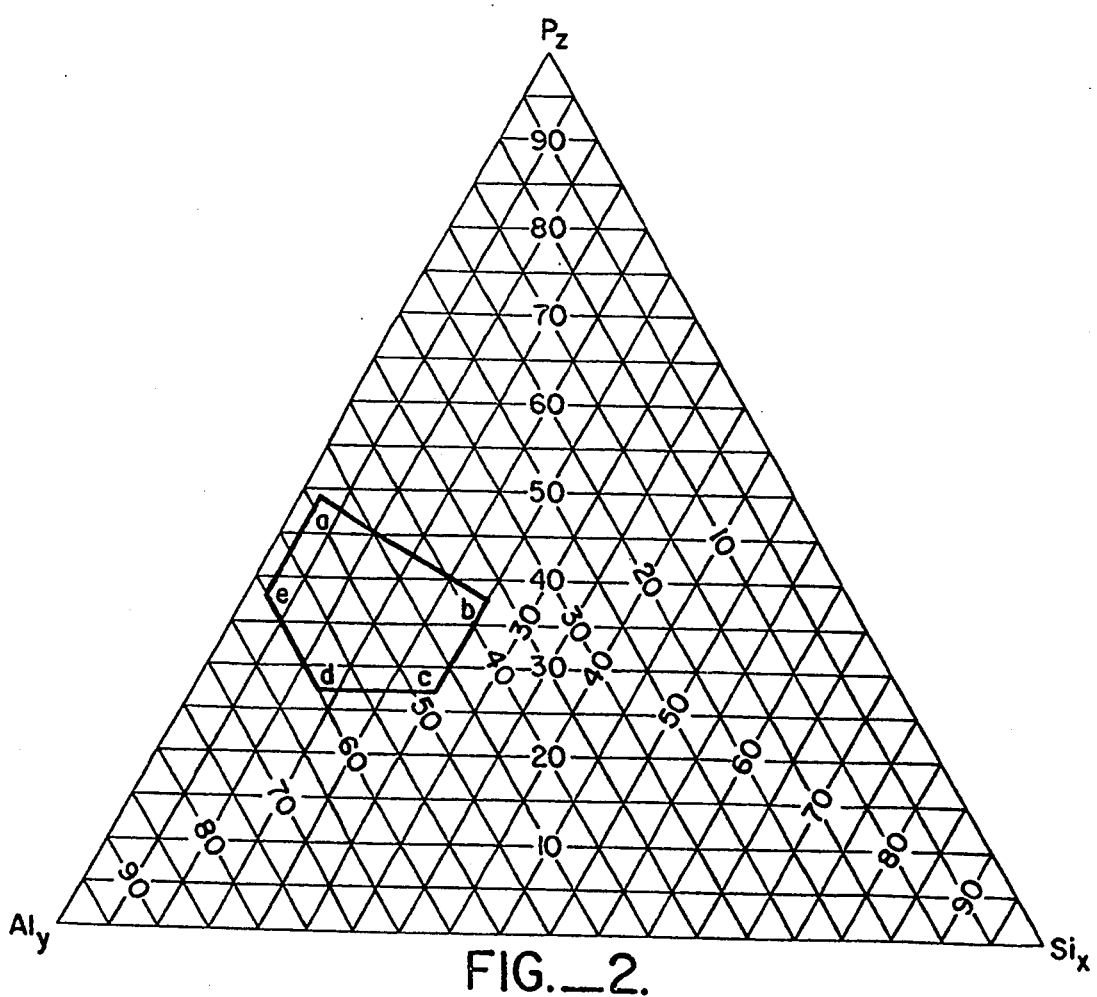
FIG. 2 is a ternary diagram showing the preferred compositional parameters of the silicoaluminophosphates of mole fractions of silicon, aluminum and phosphorus.

SAPO-11 comprises a silicoaluminophosphate material having a three-dimensional microporous crystal framework structure of [PO$_2$], [AlO$_2$] and [SiO$_2$] tetrahedral units whose unit empirical formula on an anhydrous basis is:

$$mR:(Si_xAl_yP_z)O_2$$

wherein "R" represents at least one organic templating agent present in the intracrystalline pore system; "m" represents the moles of "R" present per mole of (Si$_x$Al$_y$P$_z$)O$_2$ and has a value of from zero to about 0.3, "x", "y" and "z" represent respectively, the mole fractions of silicon, aluminum and phosphorus, said mole fractions being within the compositional area bounded by points A, B, C, D and E on the ternary diagram of FIG. 1 or preferably within the area bounded by points a, b, c, d and e on the ternary diagram of FIG. 2. The silicoaluminophosphate has a characteristic X-ray powder diffraction pattern which contains at least the d-spacings (as-synthesized and calcined) set forth below in Table V. When SAPO-11 is in the as-synthesized form "m" preferably has a value of from 0.02 to 0.3.

TABLE V

| 2Θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m-s |

All of the as-synthesized SAPO-11 compositions for which X-ray powder diffraction data have been obtained to date have patterns which are within the generalized pattern of Table VI below.

TABLE VI

| 2Θ | d | 100 × I/I$_o$ |
|---|---|---|
| 8.05–8.3 | 10.98–10.65 | 20–42 |
| 9.4–9.65 | 9.41–9.17 | 36–58 |
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9(doublet) | 3.95–3.92 | 55–60 |
| 23.15–23.35 | 3.84–3.81 | 64–74 |
| 24.5–24.9(doublet) | 3.63–3.58 | 7–10 |
| 26.4–26.8(doublet) | 3.38–3.33 | 11–19 |
| 27.2–27.3 | 3.28–3.27 | 0–1 |
| 28.3–28.5(shoulder) | 3.15–3.13 | 11–17 |
| 28.6–28.85 | 3.121–3.094 | |
| 29.0–29.2 | 3.079–3.058 | 0–3 |
| 29.45–29.65 | 3.033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0(doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2(doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

Another intermediate pore size silicoaluminophosphate molecular sieve preferably used in the process of the invention is SAPO-31 . SAPO-31 comprises a silicoaluminophosphate having a three-dimensional microporous crystal framework of [PO$_2$], [AlO$_2$] and [SiO$_2$] tetrahedral units whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of (Si$_x$Al$_y$P$_z$)O$_2$ and has a value of from zero to 0.3; "x", "y" and "z"represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2. The silicoaluminophosphate has a characteristic X-ray powder diffraction pattern (as-synthesized and calcined)

which contains at least the d-spacings set forth below in Table VII. When SAPO-31 is in the as-synthesized form, "m" preferably has a value of from 0.02 to 0.3.

TABLE VII

| 2Θ | d | Relative Intensity |
|---|---|---|
| 8.5–8.6 | 10.40–10.28 | m-s |
| 20.2–20.3 | 4.40–4.37 | m |
| 21.9–22.1 | 4.06–4.02 | w-m |
| 22.6–22.7 | 3.93–3.92 | vs |
| 31.7–31.8 | 2.823–2.814 | w-m |

All of the as-synthesized SAPO-31 compositions for which X-ray powder diffraction data have presently been obtained have patterns which are within the generalized pattern of Table VIII below.

TABLE VIII

| 2Θ | d | $100 \times I/I_o$ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35 | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.872–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from a minor impurity.

SAPO-41, also suitable for use in the process of the invention, comprises a silicoaluminophosphate having a three-dimensional microporous crystal framework structure of [PO$_2$], [AlO$_2$] and [SiO$_2$] tetrahedral units, and whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "y", and "z" represent respectively, the mole fractions of silicon, aluminum, and phosphorus, said mole fractions being within the compositional area bounded by points A, B, C, D and E on the ternary diagram of FIG. 1, or preferably within the area bounded by points a, b, c, d and e on the ternary diagram of FIG. 2, and said silicoaluminophosphate having a characteristic X-ray powder diffraction pattern (as-synthesized and cal-cined) which contains at least the d-spacings set forth below in Table IX. When SAPO-41 is in the as-synthesized form "m" preferably has a value of from 0.02 to 0.3.

TABLE IX

| 2Θ | d | Relative Intensity |
|---|---|---|
| 13.6–13.8 | 6.51–6.42 | w-m |
| 20.5–20.6 | 4.33–4.31 | w-m |
| 21.1–21.3 | 4.21–4.17 | vs |
| 22.1–22.3 | 4.02–3.99 | m-s |
| 22.8–23.0 | 3.90–3.86 | m |
| 23.1–23.4 | 3.82–3.80 | w-m |
| 25.5–25.9 | 3.493–3.44 | w-m |

All of the as-synthesized SAPO-41 compositions for which X-ray powder diffraction data have presently been obtained have patterns which are within the generalized pattern of Table X below.

TABLE X

| 2Θ | d | $100 \times I/I_o$ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The process of the invention may also be carried out using a catalyst comprising an intermediate pore size nonzeolitic molecular sieve containing AlO$_2$ and PO$_2$-tetrahedral oxide units, and at least one Group VIII metal. Exemplary suitable intermediate pore size nonzeolitic molecular sieves are set forth in European Patent Application No. 158,977 which is incorporated herein by reference.

The intermediate pore size molecular sieve is used in admixture with at least one Group VIII metal. Preferably the Group VIII metal is selected from the group consisting of at least one of platinum and palladium and optionally, other catalytically active metals such as molybdenum, nickel, vanadium, cobalt, tungsten, zinc, and mixtures thereof. Most preferably, the Group VIII metal is selected from the group consisting of at least one of platinum and palladium. The amount of metal ranges from about 0.01% to about 10% by weight of the molecular sieve, preferably from about 0.2% to about 5% by weight of the molecular sieve. The techniques of introducing catalytically active metals into a molecular sieve are disclosed in the literature, and preexisting metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996, 4,440,781 and 4,710,485 which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The physical form of the catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, spheres, extrudates, or other shapes of controlled size to accord adequate catalyst-reactant contact. The catalyst may be employed either as a fluidized catalyst, or in a fixed or moving bed, and in one or more reaction stages.

The catalytic isomerization step of the invention may be conducted by contacting the feed with a fixed stationary bed of catalyst, with a fixed fluidized bed, or with a transport bed. A simple and therefore preferred configuration is a trickle-bed operation in which the feed is allowed to trickle through a stationary fixed bed, preferably in the presence of hydrogen.

The catalytic isomerization conditions employed depend on the feed used and the desired pour point. Generally, the temperature is from about 200° C. to about 475° C., preferably from about 250° C. and to about 450° C. The pressure is typically from about 15 psig and to about 2000 psig, preferably from about 400 to about 2000 psig, more preferably from about 400 psig to about 1200 psig. The process of the invention is preferably carried out at low pressure. The liquid hourly space velocity (LHSV) is preferably from about 0.1 to about 20, more preferably from about 0.1 to about 5, and most preferably from about 0.1 to about 1.0. Low pressure and low liquid hourly space velocity provide enhanced isomerization selectivity which results in more isomerization and less cracking of the feed thus producing an increased yield.

Hydrogen is preferably present in the reaction zone during the catalytic isomerization process. The hydrogen to feed ratio is typically from about 500 to about 30,000 SCF/bbl (standard cubic feet per barrel), preferably from about 1,000 to about 20,000 SCF/bbl. Generally, hydrogen will be separated from the product and recycled to the reaction zone.

The intermediate pore size molecular sieve used in the isomerization step provides selective conversion of the waxy components to non-waxy components. During processing, isomerization of the paraffins occurs to reduce the pour point of the oil below that of the feed and form lube oil boiling range materials which contribute to a low pour point product having excellent viscosity index properties.

Because of the selectivity of the intermediate pore size silicoaluminophosphate molecular sieve used in the invention, the yield of low boiling products is reduced, thereby preserving the economic value of the feedstock.

The intermediate pore size molecular sieve catalyst can be manufactured into a wide variety of physical forms. The molecular sieves can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or, dried or partially dried and then extruded.

The molecular sieve can be composited with other materials resistant to temperatures and other conditions employed in the isomerization process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the isomerization process so that products can be obtained economically without employing other means for controlling the rate of reaction. The molecular sieve may be incorporated into naturally occurring clays, e.g., bentonite and kaolin. These materials, i.e., clays, oxides, etc., function, in part, as binders for the catalyst. It is desirable to provide a catalyst having good crush strength because in petroleum refining, the catalyst is often subjected to rough handling. This tends to break the catalyst down into powder-like materials which cause problems in processing.

Naturally occurring clays which can be composited with the molecular sieve include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumino-magnesia and silica-magnesia-zirconia. The matrix can be in the form of a cogel.

The catalyst used in the process of this invention can also be composited with other zeolites such as synthetic and natural faujasites, (e.g., X and Y) erionites, and mordenites. It can also be composited with purely synthetic zeolites such as those of the ZSM series. The combination of zeolites can also be composited in a porous inorganic matrix.

It is often desirable to use mild hydrogenation referred to as hydrofinishing after isomerization to produce more stable lubricating oils. Hydrofinishing is typically conducted at temperatures ranging from about 190° C. to about 340° C., at pressures from about 400 psig to about 3000 psig, at space velocities (LHSV) from about 0.1 to about 20, and hydrogen recycle rates of from about 400 to about 1500 SCF/bbl. The hydrogenation catalyst employed must be active enough not only to hydrogenate the olefins, diolefins and color bodies within the lube oil fractions, but also to reduce the aromatic content. The hydrofinishing step is beneficial in preparing an acceptably stable lubricating oil.

Suitable hydrogenation catalysts include conventional metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are disclosed in U.S. Patent Nos. 3,852,207; 4,157,294; 3,904,513 and 4,673,487, which are incorporated herein by reference.

The high viscosity index lube oil produced by the process of the present invention can be used as a blending component to raise the viscosity index of lube oils to a higher value. Since yield decreases with increasing viscosity index in either hydrocracking or solvent refining, the use of an isomerized wax to increase the viscosity index improves yield.

The above descriptions and particularly, the examples are set forth for purposes of illustration only and are not meant to limit the invention to any theories, but instead is limited to what is claimed herein. Many variations and modifications thereof will be apparent to those of ordinary skill in the art and can be made without departing from the spirit and scope of the invention herein described.

Comparative Example A

Figure 3:
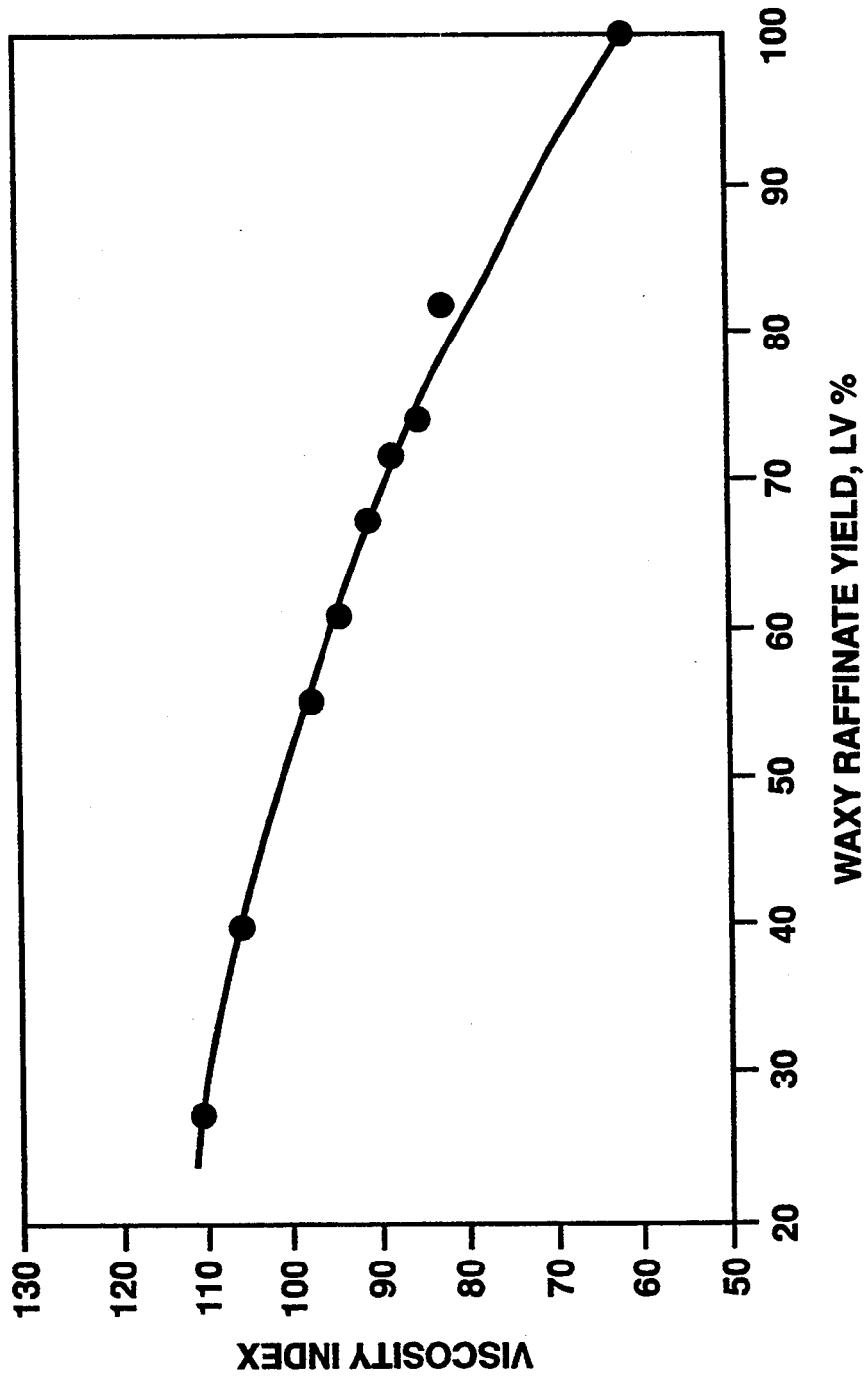
FIG. 3 is a plot of the lube yield versus the viscosity index of a solvent dewaxed raffinate for the oil set forth in Comparative Example A.

A West Texas medium distillate was solvent extracted with N-methylpyrrolidone at a 55 LV % yield of waxy raffinate. Inspections of the raffinate are given in Table XI. Solvent dewaxing this raffinate with a 4:1 mixture of methyl ethyl ketone and toluene at a solvent/oil ratio of 1.0 and a filter temperature of $-15°$ C. produced a $-12°$ C. pour point oil with a viscosity index of 96 (Table XII). The 700° F.+yield through the solvent dewax step was 84 LV%, for an overall yield based on distillate of 46 LV%. A solvent extraction study on a similar distillate feed showed that the solvent dewaxed viscosity index could not be raised above 110 without reducing the waxy raffinate yield to below 30 LV% (FIG. 3) and the overall yield based on distillate to below 21 LV%.

EXAMPLE 1

This example shows that, with the same overall yield as solvent dewaxing, when the feedstock is dewaxed in accordance with the invention the product lube oil will have an increased V.I.

SAPO-11 was grown according to U.S. Pat. No. 5,087,347, the entire disclosure of which is incorporated herein, and identified by X-ray diffraction analysis. Elemental analysis of the calcined sieve showed it to have the following anhydrous molar composition:

$0.25SiO_2:Al_2O_3:P_2O_5$

The sieve was bound with 35% Catapal alumina then impregnated with 0.35% Pt. This catalyst was used to dewax the raffinate of Table XI at 0.5 LHSV, 1100 psig total pressure, and 8 MSCF/bbl hydrogen. Results are given in Table XII showing that a V.I. of 110 could be reached without having to further reduce the waxy raffinate yield. At $-9°$ C. pour point, the overall yield based on distillate was 46 LV%.

EXAMPLE 2

SAPO-11 sieve used to make the catalyst of Example 1 was pressed into pellets, ground to 24–42 mesh, and impregnated with 0.5% Pt. This catalyst was then used to dewax the raffinate of Table XI at 0.8 LHSV, 1100 psig, and 8 MSCF/bbl $H_2$, producing a higher yield at $-15°$ C. pour point than the catalyst bound with $Al_2O_3$ (Table XII).

EXAMPLE 3

A 79/21 V/V blend was prepared of the solvent extracted oil of Table XI and a heavy neutral slack wax. Inspections of both the slack wax and the blend are given in Table XIII. This blend was then dewaxed over the Pt/SAPO-11 catalyst used in Example 1 at 0.38 LHSV, 1100 psig, and 8 MSCF/bbl $H_2$ to produce low pour point oils of V.I. greater than 120 (Table XIV).

EXAMPLE 4

A 80/20 V/V blend was prepared of a waxy light raffinate and a medium neutral slack wax. Inspections of both the raffinate and the slack wax are given in Table XV. This shows that solvent dewaxing the raffinate yields a V.I. of only 100. The blend was dewaxed over the Pt/SAPO-11 catalyst of Example 2 at 0.8 LHSV, 1100 psig, and 8 MSCF/bbl $H_2$ to produce a low pour point oil of V.I. greater than 120 (Table XVI).

TABLE XI

| Waxy Medium Raffinate Inspections | |
|---|---|
| Gravity, API | 32.5 |
| Nitrogen, ppm | 79 |
| Sulfur, ppm | 1360 |
| Viscosity, cSt, 100° C. | 5.376 |
| 70°C. | 10.88 |
| Sim. Dist., LV %, °F. | |
| ST/5 | 551/636 |
| 10/30 | 669/752 |
| 50 | 822 |
| 70/90 | 875/930 |
| 95/EP | 952/1000 |

TABLE XII

| | Dewaxing Medium Raffinate | | |
|---|---|---|---|
| Method | Solvent Dewaxing | 0.35% Pt on 65/35 SAPO-11/$Al_2O_3$ | 0.5% Pt on SAPO-11 |
| LHSV | | 0.5 | 0.5 | 0.8 |
| Pressure, psig | | 1100 | 1100 | 1100 |
| $H_2$, MSCF/bbl | | 8 | 8 | 8 |
| Cat. Temp., °F. | | 705 | 720 | 715 |
| 700° F.+ Yield, wt % | 84.4 | 84.8 | 75.5 | 82.2 |
| Pour Point, °C. | $-12$ | $-9$ | $-15$ | $-15$ |
| Cloud Point, °C. | $-9$ | $-5$ | $-14$ | $-8$ |
| Viscosity, 40° C., cSt | 39.17 | 30.96 | 28.04 | 27.93 |
| Viscosity, 100° C., cSt | 6.026 | 5.427 | 5.124 | 5.122 |
| V.I. | 96 | 110 | 112 | 112 |
| Nitrogen, ppm | | 0.1 | 0.1 | |
| Sulfur, ppm | | <6 | <6 | |
| Sim. Dist., LV %, °F. | | | | |
| ST/5 | 559/632 | 574/648 | 553/639 | 567/641 |

TABLE XII-continued

| | Dewaxing Medium Raffinate | | | |
|---|---|---|---|---|
| Method | Solvent Dewaxing | 0.35% Pt on SAPO-11/Al$_2$O$_3$ | | 0.5% Pt on SAPO-11 |
| 10/30 | 666/754 | 678/760 | 672/755 | 672/750 |
| 50 | 828 | 823 | 820 | 814 |
| 70/90 | 884/940 | 875/930 | 876/933 | 870/929 |
| 95/EP | 963/1012 | 953/1006 | 955/1006 | 954/1009 |

TABLE XIII

HN Slack Wax and Slack Wax/Medium Raffinate Blend Inspections

| | HN Slack Wax | 79/21 V/V Medium Raffinate/HN Slack Wax Blend |
|---|---|---|
| Gravity, °API | 34.9 | 33.6 |
| Nitrogen, ppm | 19 | 66 |
| Sulfur, ppm | 574 | 1200 |
| Viscosity, 100° C., cSt | 7.773 | |
| Sim. Dist., LV %, °F. | | |
| ST/5 | 692/827 | 539/640 |
| 10/30 | 858/907 | 674/780 |
| 50 | 937 | 856 |
| 70/90 | 967/1010 | 909/973 |
| 95/EP | 1036/1096 | 1005/1072 |

TABLE XIV

Dewaxing Medium Raffinate/HN Slack Wax at 0.38 LHSV, 1100 psig, and 8 MSCF/bbl H$_2$

| Catalyst Temperature, °F. | 700 | 715 |
|---|---|---|
| 700° F.+ Yield, wt % | 72.8 | 60.5 |
| Pour Point, °C. | −9 | −30 |
| Cloud Point, °C. | −5 | −24 |
| Viscosity, 40° C., cSt | 28.69 | 24.48 |
| Viscosity, 100° C., cSt | 5.413 | 4.876 |
| V.I. | 126 | 123 |
| Sim. Dist., LV %, °F. | | |
| ST/5 | 574/656 | 554/640 |
| 10/30 | 689/777 | 672/753 |
| 50 | 844 | 820 |
| 70/90 | 898/960 | 877/944 |
| 95/EP | 991/1058 | 976/1048 |
| Nitrogen, ppm | | 0.1 |
| Sulfur, ppm | | <6 |

TABLE XV

Inspections of LN Raffinate and MN Slack Wax

| Feed | LN Raffinate | MN Slack Wax |
|---|---|---|
| Gravity, °API | 34.1 | 38.9 |
| Nitrogen, ppm | 28 | 12 |
| Sulfur, ppm | 331 | 286 |
| Pour Point, °C. | +18 | |
| Viscosity, cSt, 100° C. | 3.850 | 4.499 |
| Wax, wt % | 13.3 | |
| Oil in Wax, wt % | 0.5 | 23.6 |
| DWO Pour/Cloud, °C. | −6/−2 | |
| DWO Viscosity, cSt, 100° C. | 4.138 | |
| DWO Viscosity, cSt, 40° C. | 20.65 | |
| DWO V.I. | 100 | |
| Sim. Dist., LV %, °F. | | |
| ST/5 | 584/658 | 613/699 |
| 10/30 | 678/721 | 737/807 |
| 50 | 757 | 843 |
| 70/90 | 793/842 | 874/910 |
| 95/EP | 863/909 | 928/970 |

TABLE XVI

Dewaxing 80/20 LN Raffinate/MN Slack Wax Over Pt/SAPO-11 at 680° F., 0.8 LHSV, 1100 psig, and 8 MSCF/bbl H$_2$

| | |
|---|---|
| 700° F.+ Yield, wt % | 78.3 |
| Pour Point, °C. | −18 |
| Cloud Point, °C. | −6 |
| Viscosity, 40°, cSt | 17.03 |
| 100° C., cSt | 3.866 |
| V.I. | 121 |
| Sim. Dist., LV %, °F. | |
| ST/5 | 597/660 |
| 10/30 | 681/729 |
| 50 | 766 |
| 70/90 | 805/858 |
| 95/EP | 882/934 |

What is claimed is:

1. A process for producing lube oil stock comprising contacting a raffinate having a solvent dewaxed viscosity index of at least 90 and boiling above 350° F. with a catalyst comprising an intermediate pore size silicoaluminophosphate molecular sieve and at least one Group VIII metal under dewaxing conditions so as to produce a product having a viscosity index greater than about 110.

2. A process for producing a lube oil stock comprising:
   a) mixing a solvent refined hydrocarbonaceous feedstock with a slack wax to form a mixture whereby the volumetric ratio of feedstock to slack wax in the mixture ranges from about 95:5 to about 1:1; and
   b) contacting said mixture with a catalyst comprising an intermediate pore size silicoaluminophosphate molecular sieve and at least one Group VIII metal under dewaxing conditions so as to produce a product having a viscosity index greater than about 110.

3. The process of claim 1 wherein said silicoaluminophosphate is selected from the group consisting of SAPO-11, SAPO-31, and SAPO-41.

4. The process of claim 2 wherein said silicoaluminophosphate is selected front the group consisting of SAPO-11, SAPO-31, and SAPO-41.

5. The process of claims 1 or 2 wherein said silicoaluminophosphate is SAPO-11.

6. The process of claims 1, 2, 3, or 4 wherein the Group VIII metal is selected from the group consisting of platinum and palladium.

7. The process of claim 1 or 2 wherein said process is conducted at a temperature of about 200° C. to 475° C., and a pressure of about 15 psig to about 3000 psig.

8. The process of claim 7 wherein said pressure is from about 400 psig to about 3000 psig.

9. The process of claim 8 wherein said pressure is from about 400 to about 1200 psig.

10. The process of claim 1 wherein said product has a viscosity index of from about 110 to about 120.

11. The process of claim 2 wherein said products have a viscosity index of from about 110 to about 130.

12. The process of claims 1 or 2 wherein said feedstock is selected from the group consisting of heavy neutral, medium neutral, light neutral and mixtures thereof.

13. The process of claim 2 wherein said mixture has a volumetric ratio of feedstock to slack wax ranging between about 10:1 to about 1:1.

14. The process of claim 2 wherein said slack wax has a viscosity that varies by no more than about 10% from the viscosity of the product lube oil.

15. The process of claim 2 wherein said slack wax has a viscosity that varies by no more than about 5% from the viscosity of the product lube oil.

16. The process of claim 2 wherein said slack wax has a viscosity that is substantially the same as that of the product lube oil.

17. The process of claim 2 wherein said feedstock is a light neutral oil and said slack wax is a medium neutral slack wax.

18. The process of claim 2 wherein said feedstock is a medium neutral oil and said slack wax is a heavy neutral slack wax.

* * * * *